(12) United States Patent
Ren et al.

(10) Patent No.: US 8,939,222 B2
(45) Date of Patent: Jan. 27, 2015

(54) SHAPED MEMORY POLYPHENYLENE SULFIDE (PPS) FOR DOWNHOLE PACKER APPLICATIONS

(75) Inventors: Jiaxiang Ren, Houston, TX (US); David P. Gerrard, Magnolia, TX (US); James E. Goodson, Porter, TX (US); Li Guo, Houston, TX (US); Ping Duan, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 577 days.

(21) Appl. No.: 13/229,923

(22) Filed: Sep. 12, 2011

(65) Prior Publication Data

US 2013/0062049 A1   Mar. 14, 2013

(51) Int. Cl.
*E21B 33/12* (2006.01)
*B29C 44/56* (2006.01)

(52) U.S. Cl.
CPC ......... *B29C 44/5636* (2013.01); *E21B 33/1208* (2013.01)
USPC .......................................... 166/387; 166/373

(58) Field of Classification Search
USPC .......................................... 166/387, 207, 373
See application file for complete search history.

(56) References Cited

U.S. PATENT DOCUMENTS

| | | |
|---|---|---|
| 2,466,963 A | 4/1949 | Patrick et al. |
| 3,487,052 A | 12/1969 | Koons et al. |
| 3,699,087 A | 10/1972 | Brown et al. |
| 3,737,411 A | 6/1973 | Scoggins |
| 3,782,458 A | 1/1974 | Slack |
| 3,793,281 A | 2/1974 | Acle, Jr. |
| 3,954,932 A | 5/1976 | Coale |
| 4,020,054 A | 4/1977 | Fodor |
| 4,137,970 A | 2/1979 | Laflin et al. |
| 4,191,254 A | 3/1980 | Baughman et al. |
| 4,308,352 A | 12/1981 | Knaus |
| 4,414,269 A | 11/1983 | Lubowitz et al. |
| 4,415,269 A | 11/1983 | Fraser |
| 4,431,761 A | 2/1984 | Hergenrother |
| 4,475,847 A | 10/1984 | Cornely et al. |
| 4,591,615 A | 5/1986 | Aldred et al. |
| 4,690,972 A | 9/1987 | Johnson et al. |

(Continued)

FOREIGN PATENT DOCUMENTS

| | | |
|---|---|---|
| EP | 2009723 A1 | 12/2008 |
| JP | 59157151 A | 9/1984 |

(Continued)

OTHER PUBLICATIONS

International Search Report and Written Opinion; International Application No. PCT/US2012/054083; International Filing Date Sep. 7, 2012; Date of Mailing: Dec. 14, 2012; 8 pages.

(Continued)

*Primary Examiner* — Catherine Loikith
(74) *Attorney, Agent, or Firm* — Cantor Colburn LLP (57) ABSTRACT

A downhole element to isolate or complete a wellbore includes a shape memory material including polyphenylene sulfide. The polyphenylene sulfide is the cure product of being cured at a temperature of about 200° C. to about 400° C., for a total time of less than or equal to 200 hours. The shape memory material is thermally activated between an actuated and unactuated shape, and the polyphenylene sulfide in the shape memory material is a closed cell foam, open cell foam, or solid.

21 Claims, 4 Drawing Sheets

(56) References Cited

U.S. PATENT DOCUMENTS

| | | | |
|---|---|---|---|
| 4,862,967 A * | 9/1989 | Harris | 166/387 |
| 4,940,733 A | 7/1990 | Kuphal et al. | |
| 5,086,125 A | 2/1992 | Ohta et al. | |
| 5,272,247 A | 12/1993 | Sotokawa et al. | |
| 5,488,084 A | 1/1996 | Kadoi et al. | |
| 5,580,931 A | 12/1996 | Aguirre | |
| 5,789,083 A | 8/1998 | Thomas | |
| 5,803,172 A | 9/1998 | Rajkovich | |
| 5,886,130 A | 3/1999 | Trimmer et al. | |
| 6,001,934 A | 12/1999 | Yamanaka et al. | |
| 6,160,239 A | 12/2000 | Cubero Pitel | |
| 6,446,717 B1 | 9/2002 | White et al. | |
| 6,485,806 B1 | 11/2002 | Tateyama et al. | |
| 6,854,522 B2 | 2/2005 | Brezinski et al. | |
| 6,896,063 B2 | 5/2005 | Chang et al. | |
| 6,907,936 B2 | 6/2005 | Fehr et al. | |
| 6,907,937 B2 | 6/2005 | Whanger et al. | |
| 6,976,537 B1 | 12/2005 | Verret | |
| 6,977,057 B2 | 12/2005 | Reitz et al. | |
| 7,045,082 B2 | 5/2006 | Dietzen et al. | |
| 7,109,249 B2 | 9/2006 | Bruza et al. | |
| 7,268,193 B2 | 9/2007 | Marrocco, III et al. | |
| 7,291,201 B2 | 11/2007 | Duh et al. | |
| 7,387,158 B2 | 6/2008 | Murray et al. | |
| 7,392,852 B2 | 7/2008 | Richard | |
| 7,615,476 B2 | 11/2009 | Hua | |
| 7,655,705 B2 | 2/2010 | Scherzer et al. | |
| 7,743,825 B2 * | 6/2010 | O'Malley et al. | 166/179 |
| 8,048,348 B2 | 11/2011 | Duan et al. | |
| 8,167,190 B1 | 5/2012 | Bullock et al. | |
| 8,519,505 B2 | 8/2013 | Hiroshige et al. | |
| 2003/0032739 A1 | 2/2003 | Kerres et al. | |
| 2003/0069082 A1 | 4/2003 | Sullivan | |
| 2003/0132271 A1 | 7/2003 | Kao et al. | |
| 2004/0112478 A1 | 6/2004 | Bieler et al. | |
| 2004/0138321 A1 | 7/2004 | Hashimoto et al. | |
| 2004/0259446 A1 | 12/2004 | Jain et al. | |
| 2004/0266940 A1 | 12/2004 | Issari | |
| 2005/0089688 A1 | 4/2005 | Mungioli et al. | |
| 2005/0205263 A1 | 9/2005 | Richard | |
| 2006/0011267 A1 | 1/2006 | Kay et al. | |
| 2006/0019090 A1 | 1/2006 | Wessling | |
| 2006/0045395 A1 | 3/2006 | Shimazu et al. | |
| 2006/0051540 A1 | 3/2006 | Kagawa | |
| 2006/0124304 A1 | 6/2006 | Bloess et al. | |
| 2006/0125136 A1 | 6/2006 | Kratzmuller | |
| 2007/0020417 A1 | 1/2007 | Murakami | |
| 2007/0021549 A1 | 1/2007 | Kojima et al. | |
| 2007/0072828 A1 | 3/2007 | Yoo | |
| 2007/0106050 A1 | 5/2007 | Sokolowski et al. | |
| 2007/0240877 A1 | 10/2007 | O'Malley et al. | |
| 2008/0161453 A1 | 7/2008 | Lee et al. | |
| 2008/0220567 A1 | 9/2008 | Mahler et al. | |
| 2009/0036605 A1 | 2/2009 | Ver Meer | |
| 2009/0084539 A1 | 4/2009 | Duan et al. | |
| 2009/0131557 A1 | 5/2009 | Uyama et al. | |
| 2009/0242850 A1 | 10/2009 | Park et al. | |
| 2010/0012708 A1 | 1/2010 | Steward et al. | |
| 2010/0089565 A1 | 4/2010 | Duan et al. | |
| 2010/0210813 A1 | 8/2010 | Foder et al. | |
| 2011/0003955 A1 | 1/2011 | Nishino et al. | |
| 2011/0052444 A1 | 3/2011 | Hrametz et al. | |
| 2011/0139314 A1 | 6/2011 | Ho et al. | |
| 2011/0144223 A1 | 6/2011 | Sriram et al. | |
| 2011/0162788 A1 | 7/2011 | Mizrahi | |
| 2012/0090830 A1* | 4/2012 | O'Malley et al. | 166/135 |
| 2012/0178834 A1 | 7/2012 | Linder et al. | |
| 2012/0305238 A1 | 12/2012 | Duan et al. | |
| 2013/0062049 A1 | 3/2013 | Ren et al. | |
| 2013/0256991 A1* | 10/2013 | Ramon et al. | 277/316 |

FOREIGN PATENT DOCUMENTS

| | | |
|---|---|---|
| JP | 9096186 A | 4/1997 |
| WO | 9207024 A1 | 4/1992 |
| WO | 03014517 A1 | 2/2003 |
| WO | 2005052316 A2 | 6/2005 |
| WO | 2005059304 A1 | 6/2005 |
| WO | 2007101845 | 9/2007 |
| WO | 2010095139 | 8/2010 |

OTHER PUBLICATIONS

Patrick T. Mather et al., "Shape Memory Polymer Research"; Annual Review of Materials Research; Annu. Rev. Mater. Res. 2009, 39; 445-471.

Qinghao Meng et al., "A Review of shape memory polymer composites and blends"; Composites: Part A, vol. 40, 2009; pp. 1661-1672.

Ren, et al.; "Development and Characterization of an Elastomeric Material for High-Pressure and High-Temperature Downhole Sealing Applications"; Presentation at 2011 World Oil HPHT Drilling and Completion Conference; Abstract Date Mar. 11, 2011; only one page.

Collins et al., "Thermal Fatigue and Failure Analysis of SnAgCu Solder Alloys with Minor Pb Additions", IEEE Transactions on Components, Packaging and Manufacturing Tech. vol. 1, No. 10 (Oct. 2011).

Dan Lu et al., "Effects of Ball Milling Dispersion of Nano-SiOx Particles on Impact Strength and Crystallization Behavior of Nano-SiOx-Poly(phenylene sulfide) Nanocomposites," Polymer Engineering and Science, 2006, pp. 820-825.

Fu Guo, "Composite lead-free electronic solders", J Mater Sci: Mater Electron 18:129-145 (2007).

International Search Report and Written Opinion; International Application No. PCT/US2012/045550; International filing date: Jul. 5, 2012; Date of mailing Jan. 25, 2013; 8 pages.

International Search Report and Written Opinion; International Application No. PCT/US2012/045552; International filing date: Jul. 5, 2012; Date of mailing Jan. 25, 2013; 8 pages.

International Search Report and Written Opinion; International Application No. PCT/US2012/054083; International filing date Sep. 7, 2012; Date of mailing Dec. 14, 2012 (8 pages).

International Search Report for International Application No. PCT/US2012/057033; International filing date: Sep. 25, 2012; Date of mailing: Mar. 29, 2013 (4 pgs).

International Search Report for International Application No. PCT/US2012/059682; International filing date: Oct. 11, 2012; Date of mailing: Mar. 29, 2013 (4 pgs).

International Search Report for International Application No. PCT/US2012/061098; International filing date: Oct. 19, 2012; Date of mailing: Mar. 12, 2013 (3 pgs).

Stacy, "Molecular Weight Distribution of Polyphenylene Sulfide by High Temperature Gel Permeation Chromatography", 1986, Journal of Applied Polymer Science, vol. 32, p. 3959-3959.

PCT International Search Report and Written Opinion; International Application No. PCT/US2013/069076; International Filing Date: Nov. 8, 2013; Date of Mailing: Feb. 27, 2014; pp. 1-9.

PrimoSpire PR-250 Product Data Sheet, Solvay Specialty Polymers, Sep. 28, 2010, 3 pages.

Sun et al., "Preparation, characterization, and mechanical properties of some microcellular polysulfone foams", Journal of Applied Polymer Science, vol. 86, Issue 7, pp. 1692-1701, Nov. 14, 2002.

Takemoto et al., "Electrochemical Migration Tests of Solder Alloys in Pure Water", Corrosion Science, vol. 39, No. 8. pp. 1415-1430 (1997).

* cited by examiner

SHAPED MEMORY POLYPHENYLENE SULFIDE (PPS) FOR DOWNHOLE PACKER APPLICATIONS

BACKGROUND

Shape memory polymers (SMPs) are polymers that regain their original shape when heated above their glass transition temperature (Tg). Articles are formed from shape memory polymers by first heating above the glass transition temperature and then shaping the polymer, then subsequently fixing the shape by cooling to below the glass transition temperature. During deployment, the shaped article is heated above the glass transition temperature to allow recovery of the first molded shape.

Shape memory polymers are useful as materials of construction of elements for variety of downhole applications, particularly those that require the sealing off of a portion of a borehole or constricting the spacing around an element, whether coaxial with the borehole or otherwise. While a number of different shape memory polymers are commercially available, SMPs having still greater thermal and chemical stability, as well as low cost, are desirable.

SUMMARY

The above and other deficiencies of the prior art are overcome by, in an embodiment, a downhole element to isolate or complete a wellbore comprising a shape memory material including polyphenylene sulfide, wherein the polyphenylene sulfide is a cure product of being cured at a temperature of about 200° C. to about 400° C., for a total time of less than or equal to 200 hours, the shape memory material is thermally activated between an actuated and unactuated shape, and the polyphenylene sulfide in the shape memory material is a closed cell foam, open cell foam, or solid.

In another embodiment, a method of preparing a downhole element for isolating or completing a wellbore comprises compounding polyphenylene sulfide with a crosslinker, and optionally, an additive, to form a mixture; forming a solid or foam of the mixture; heating and curing the solid or foam at a temperature of about 300° C. to about 400° C., for a heating time of less than or equal to about 72 hours to respectively produce a cured solid or cured closed or open cell foam; compression molding the cured solid or cured closed or open cell foam; and de-molding at a temperature greater than or equal to about the glass transition temperature of the cured solid or cured closed or open cell foam to form the downhole element, wherein the downhole element is thermally activated between an actuated and unactuated shape.

BRIEF DESCRIPTION OF THE DRAWINGS

Referring now to the drawings, wherein like elements are numbered alike in the several Figures.

DETAILED DESCRIPTION

A detailed description of one or more embodiments of the disclosed apparatus and method are presented herein by way of exemplification and not limitation.

A cured thermoplastic material as disclosed herein is prepared by thermal cure of a high-temperature thermoplastic polymer, in the presence of oxygen. The cured thermoplastic polymer has lower crystallinity and greater thermal stability than the thermoplastic material prior to curing as well as improved shape memory properties such as more rapid recovery rate and near-quantitative recovery of at least one pre-compression dimension.

Thermoplastic polymers curable by the method are not particularly limited provided they are high-temperature thermoplastics having balanced mechanical properties at high temperature, as well as good chemical resistance and that are curable by an oxidative crosslinking mechanism.

High temperature thermoplastic polymers include those having a thermal stability, as evidenced by the thermal decomposition temperature, of greater than or equal to about 200° C., specifically greater than or equal to about 250° C., and more specifically greater than or equal to about 300° C. The thermoplastic polymer is semi-crystalline or amorphous.

The thermoplastic polymer has a weight averaged molecular weight (Mw) of about 500 to about 100,000 grams/mole (g/mol), specifically about 1,000 to about 75,000 g/mol, more specifically about 1,500 to about 50,000 g/mol, and still more specifically about 2,000 to about 25,000 g/mol. In addition, the thermoplastic polymer has a melt flow, determined according to ASTM D 1283 at 316° C. under a 5 kilogram (kg) load, of greater than or equal to about 1 g/10 minutes (min), specifically greater than or equal to about 10 g/10 min, and more specifically greater than about 50 g/10 min. Also, the thermoplastic polymer has a melt flow, determined according to ASTM D 1283 at 316° C. under a 5 kg load, of less than or equal to about 7,500 g/10 minutes, specifically less than or equal to about 6,500 g/10 minutes, and still more specifically less than or equal to about 5,500 g/10 minutes.

The thermoplastic polymer is linear or is branched, having a number of branches of greater than or equal to 1, specifically greater than or equal to 2, or more specifically greater than or equal to 5 branching points per 1,000 carbon atoms along the polymer chain. Further, the molecular weight can be different among the linear and branched forms of the same thermoplastic polymer. Particularly, the molecular weight of a linear thermoplastic polymer is about 500 g/mol to about 100,000 g/mol, more particularly about 1000 g/mol to about 70,000 g/mol, and the molecular weight of a branched thermoplastic polymer is about 500 g/mol to about 100,000 g/mol, more particularly about 1000 g/mol to about 75,000 g/mol.

In an embodiment, the thermoplastics used herein are aromatic thermoplastics. Examples of thermoplastic polymers include polyamides, polyimides, polyetherimides, polyphenylene sulfides (PPS), polyaryletherketones (PAEK), polyetherether ketones (PEEK), polyethersulfones (PESU), polyphenylenesulfones (PPSU), polyphenylenesulfone ureas, or the like, or combinations comprising at least one of the foregoing. The thermoplastic polymers are linear or branched and are homopolymers or copolymers that include two or more of the foregoing exemplary polymers. Copolymers include random, alternating, graft, and block copolymers, the block copolymers having two or more blocks of different homopolymers, random copolymers, or alternating copolymers. The thermoplastic polymers can further be chemically modified to include, for example, functional groups such as halogen, alcohol, ether, ester, amide, etc. groups, or can be oxidized, hydrogenated, etc. Exemplary thermoplastics include polyphenylene sulfides with either a branched structure, such as those marketed under the tradename RYTON® by Chevron-Phillips, or a linear structure, such as those marketed under the tradename FORTRON® by Ticona. In an embodiment, the thermoplastic polymer is a polyphenylene sulfide. In a specific embodiment, the thermoplastic polymer is branched. The thermoplastic polymer is obtained and used in pellet or powder form. Further, the polyphenylene sulfide may be p-polyphenylene sulfide, m-polyphenylene sulfide, o-polyphenylene sulfide, or a combination thereof.

In an embodiment, a thermoplastic material includes the cure product of a thermoplastic polymer having a thermal decomposition temperature greater than or equal to about 200° C., the thermoplastic polymer being cured at a temperature of about 200° C. to about 400° C., for a total time of less than or equal to 200 hours. In a specific embodiment, a thermoplastic material comprises a cure product of polyphenylene sulfide.

In another embodiment, a reactive elastomer or fluoropolymer is blended with the thermoplastic polymer before cure, and grafts to the thermoplastic polymer during cure to increase flexibility of the cured thermoplastic material. In an alternative embodiment, the reactive elastomer or fluoropolymer is blended with the thermoplastic polymer before crosslinking. Exemplary useful reactive elastomers or fluoropolymers include polytetrafluoroethylene (PTFE), nitrile-butyl rubber (NBR), hydrogenated nitrile-butyl rubber (HNBR), high fluorine content fluoroelastomers rubbers such as those in the FKM family and marketed under the tradename VITON® fluoroelastomers (available from FKM-Industries) and perfluoroelastomers such as FFKM (also available from FKM-Industries) and marketed under the tradename KALREZ® perfluoroelastomers (available from DuPont), and VECTOR® adhesives (available from Dexco LP), organopolysiloxanes such as functionalized or unfunctionalized polydimethylsiloxanes (PDMS), tetrafluoroethylene-propylene elastomeric copolymers such as those marketed under the tradename AFLAS® and marketed by Asahi Glass Co., ethylene-propylene-diene monomer (EPDM) rubbers, polyvinylalcohol (PVA), and the like, and combinations comprising at least one of the foregoing polymers.

The cured thermoplastic material is prepared by curing the thermoplastic polymer in the presence or absence of oxygen. Oxygen is included during curing as either pure oxygen or a mixture of gases. Where a mixture of gases is used, oxygen is mixed with any suitable inert gas such as, for example, nitrogen, helium, argon, carbon dioxide, or the like. In an embodiment, curing is carried out in air. Curing is carried out at ambient pressure, at a partial pressure lower than ambient, or at elevated pressures (>1 atmosphere).

Curing is carried out at a temperature of about 200 to about 400° C., specifically about 250 to about 390° C., and more specifically about 300 to about 380° C. The curing time is for a total time of less than or equal to 200 hours. In an embodiment, where curing is in the presence of oxygen and/or a crosslinker, the curing time is for a total time of less than or equal to about 72 hours, specifically less than or equal to about 48 hours, and still more specifically less than or equal to about 24 hours. In an exemplary embodiment, curing is carried out at a temperature of about 350 to about 375° C., for a time of about 1 to about 20 hours, specifically about 2 to about 6 hours, in air atmosphere at ambient pressure. In another exemplary embodiment, curing is carried out at a temperature of about 350 to about 375° C., for a time of about 1 to about 200 hours, in the absence of oxygen and at ambient pressure. It will be understood that where the curing temperature is close to or at about the thermal decomposition temperature, a combination of curing temperature and time is used such that during curing, the cured thermoplastic material exhibits less than or equal to 10% weight loss, specifically less than 5% weight loss, and more specifically less than 1% weight loss.

Without being bound by theory, the mechanism involved in curing the thermoplastic polymer includes, for example, chain extension, oxidative crosslinking, thermal crosslinking, oxygen uptake followed by loss of $SO_2$, and a combination thereof. The degree of crosslinking can be regulated by control of the curing process, such as controlling the curing temperature, curing time, and curing environment, for example, varying the relative amounts of the thermoplastic polymer and oxygen. Further, controlling the curing process can regulate the degree of crystallinity. In an embodiment, the cured thermoplastic material is amorphous. In another embodiment, the cured thermoplastic material has a high degree of crystallinity, based on the degree of curing.

The cured thermoplastic material is partially cured, or fully cured. Where the thermoplastic polymer is fully cured, the cured thermoplastic material is completely amorphous, without showing a melting temperature ($T_m$) transition as determined by, for example, differential scanning calorimetry (DSC), which corresponds to the melting of any of the crystalline regions of the semi-crystalline high temperature thermoplastic polymer. Alternatively, the cured thermoplastic material is partially cured, where analysis by DSC shows a reduction in the heat flow at the melting temperature ($T_m$) relative to that of the uncured thermoplastic polymer. Where the cured thermoplastic material is only partially cured, the cured thermoplastic material is semi-crystalline. As used herein, "semi-crystalline" means having a degree of crystallinity less than that of the uncured thermoplastic material. For example, where the thermoplastic material is about 30% crystalline (based on weight or volume) prior to curing, the cured thermoplastic material after partial cure can be about 10% crystalline. Partial cure can also be localized, based on the degree of exposure of the thermoplastic polymer to the oxygen atmosphere during curing. For example, where the thermoplastic polymer is provided as a pellet or particle, partial cure is obtained where the outermost, exposed portion (surface or layer) of a particle of the cured thermoplastic material is cured and has a low crystallinity (e.g., less than or equal to about 5% crystallinity, specifically less than or equal to about 2% crystallinity, and more specifically less than or equal to about 1% crystallinity, based on volume), or is fully amorphous, while the interior of the pellet or particle is uncured. The portion cured, in this instance, corresponds to the diffusion depth of the oxygen into the pellet or particle during cure, and varies with variation in cure condition, i.e., temperature, pressure, oxygen concentration, and time.

Both the uncured thermoplastic polymer and the cured thermoplastic material each have a glass transition temperature $T_g$ higher than ambient temperature. In an embodiment, the cured thermoplastic material has a $T_g$, corresponding to the amorphous regions, of greater than or equal to about 50° C., specifically greater than or equal to about 60° C., more specifically greater than or equal to about 70° C., and still more specifically greater than or equal to about 90° C.

In an embodiment, the cured thermoplastic material has a storage modulus of greater than or equal to about 1 megapascal (MPa), more specifically about 1.2 MPa, and still more specifically greater than or equal to about 1.5 MPa, determined at a temperature of greater than or equal to about 250° C., greater than or equal to about 275° C., and more specifically greater than or equal to about 300° C.

In another embodiment, the thermoplastic polymer is compounded with an additive prior to curing and is then cured to form the thermoplastic material. Additive, as broadly used herein, includes any compound added to the thermoplastic to adjust the properties of the cured thermoplastic material, and includes for example a material such as a water-soluble additive useful for preparing a foam, or other additive such as a filler, crosslinker, or processing aid.

Fillers, as used herein, include reinforcing and non-reinforcing fillers. Reinforcing fillers include, for example, silica, glass fiber, carbon fiber, or carbon black, which can be added to the polymer matrix to increase strength. Non-reinforcing fillers such as polytetrafluoroethylene (PTFE), molybdenum disulfide ($MoS_2$), or graphite can be added to the polymer matrix to increase the lubrication. Nanofillers are also useful, and are reinforcing or non-reinforcing. Nanofillers, such as a carbon nanotubes, nanographenes, nanoclays, polyhedral oligomeric silsesquioxane (POSS), or the like, can be incorporated into the polymer matrix to increase the strength and elongation of the material. Nanofillers can further be functionalized to include grafts or functional groups to adjust properties such as solubility, surface charge, hydrophilicity, lipophilicity, and other properties. Combinations comprising at least one of the foregoing fillers can be used.

The crosslinker, where included, is for example elemental sulfur, silica, a quinone, a peroxy compound, a metal peroxide, a metal oxide, or a combination comprising at least one of the foregoing crosslinkers. Exemplary quinones include p-benzoquinone, tetramethylbenzoquinone, naphthoquinone, and the like. Peroxy compounds useful as crosslinkers include alkyl or aryl diperoxy compounds, and metal peroxides. Exemplary aryl diperoxy compounds include those based on dicumyl peroxide (DCP) and marketed by Arkema, Inc. under the tradename DI-CUP® including, DI-CUP® dialkyl peroxide, DI-CUP® 40KE dialkyl peroxide (on calcium carbonate support), DI-CUP® 40K dialkyl peroxide, DI-CUP® 40KE dialkyl peroxide; and alkyl diperoxy compounds including 2,5-dimethyl-2,5-di(t-butylperoxy) hexane and marketed by Akzo-Nobel under the tradename TRIGONOX® 101. Exemplary metal peroxides include magnesium peroxide, calcium peroxide, zinc peroxide, or the like, or a combination comprising at least one of the foregoing. Metal oxides useful as crosslinkers include, for example, zinc oxide, magnesium oxide, titanium dioxide, or the like, or a combination comprising at least one of the foregoing.

A processing aid is a compound included to improve flow, moldability, and other properties of the cured thermoplastic material. Processing aids include, for example an oligomer, a wax, a resin, a fluorocarbon, or the like, or a combination comprising at least one of the foregoing. Exemplary processing aids include stearic acid and derivatives, low molecular weight polyethylene, and the like.

In an embodiment, the additive is blended with the thermoplastic polymer before or after curing. Particularly, a metal oxide or polymer containing oxygen is added to produce a thermoplastic polymer with a high degree of crosslinking. Polymers containing oxygen include, for example, acetal resins (e.g., polyoxymethylene (POM)), polyester resins (e.g., poly(ethylene terephthalate) (PET), poly(butylene terephthalate) (PBT), and poly(ethylene naphthalate) (PEN)), polyarylates (PAR), poly(phenylene ether) (PPE), polycarbonate (PC), aliphatic polyketones (e.g., polyketone (PK)), poly (ether ketones) (e.g., polyetheretherketone (PEEK), polyetherketone (PEK), polyetherketoneketone (PEKK), polyetherketone etherketone ketone (PEKEKK)), self-reinforced polyphenylene (SRP), and acrylic resins (e.g., polymethylmethacrylate (PMMA)).

In an embodiment, a peroxide initiator is compounded with the thermoplastic polymer before or after curing. Peroxide initiators include, for example, inorganic and organic peroxides such as ketone peroxides, diacyl peroxides, dialkyl peroxides, peroxyesters, peroxyketals, hydroperoxides, peroxydicarbonates, and peroxymonocarbonates. Exemplary peroxide initiator compounds include, but are not limited to, hydrogen peroxide, peroxydisulfate salts, persulfate salts acetylacetone peroxide, methylethylketone peroxide, cyclohexanone peroxide, methylisobutylketone peroxide; benzoyl peroxide, lauroyl peroxide, isobutyryl peroxide, acetyl peroxide, 2,4-dichlorobenzoyl peroxide, succinic acid peroxide, decanoyl peroxide, diisononanoyl peroxide; tert-butyl peroxide-2-ethyl hexanoate; 1,1-ditert-butylperoxy-3,3,5-trimethyl cyclohexane, and 1,3-bis(tert-butylperoxyisopropyl) benzene. The peroxide initiator is used in an amount known in the art, for example, about 0.01 to about 20 weight percent (wt. %), specifically about 0.5 to about 5 wt. %, and more specifically about 0.5 to about 2 wt. %, based on the weight of the thermoplastic polymer.

In preparing a mixture for a shape memory foam, a water-soluble additive is included. Exemplary water-soluble additives include salts such as sodium chloride, potassium chloride, potassium iodide, sodium sulfate, or other salt having a high solubility in water. Pore size, closed versus open cell porosity, and distribution are controlled in foams by the concentration and particle size of the water-soluble additive.

In an embodiment, the cured thermoplastic material is open cell foam. The open cells are voids in the foam that allow communication of a fluid through the pores of the open cell foam. The blowing agent used to create the foam can be a physical blowing agent or chemical blowing agent. Examples of the blowing agent include hydrochlrorofluorocarbons, hydrocarbons (for example, pentane, isopentane, and cyclopentane), $CO_2$, and water.

According to another embodiment, the cured thermoplastic material is a closed cell foam. The closed cells are voids in the foam that are not in communication but contain a fluid, which is a gas or liquid. Examples of the fluid include air, inert gas, sulfur-containing compounds, oxygen-containing compounds, or a combination thereof. The fluid can be produced during polymerization or curing or can be from a blowing agent as well as entrapment of, e.g., ambient gases in the closed cells. The blowing agent can be a physical blowing agent or chemical blowing agent. Examples of the blowing agent include hydrochlrorofluorocarbons, hydrocarbons (for example, pentane, isopentane, and cyclopentane), $CO_2$, and water.

In a further embodiment, the cured thermoplastic material is a solid. Although the solid may contain some pores, it will be understood that the closed or open cell foam differs from the solid cured thermoplastic material at least in part due to the number density and uniformity of pores that characterize open and closed cell foams.

The cured thermoplastic material can be pulverized prior to any compounding and/or molding. Pulverizing is done by any suitable method including use of a mortar and pestle, ball mill, grinder, or the like, so long as the particle size of the resultant pulverized cured thermoplastic material is suitable for adequate mixing. Any suitable particle size can be obtained by the pulverizing. In an embodiment, the thermoplastic material is pulverized into a particle size of less than or equal to about 10 mesh, specifically less than or equal to about 20 mesh, and more specifically less than or equal to about 40 mesh. It will be understood that "less than" a mesh size refers to particle size defined by mesh number which is inversely correlated to particle size, i.e., the higher the mesh number, the smaller the particle size.

The shape memory material is prepared by, for example, curing the thermoplastic polymer in the presence of oxygen, compacting the cured thermoplastic polymer at a low processing temperature (for example, at less than or equal to about 200° C.), heating the cured thermoplastic polymer to a temperature greater than the glass transition temperature of the cured thermoplastic polymer, compression molding the cured thermoplastic polymer, and de-molding at a temperature greater than or equal to about the glass transition temperature of the cured thermoplastic polymer. Curing and heating are effected in the same or in separate steps.

Without being bound by theory, it is believed that the degree of crosslinking of the thermoplastic polymer partially determines the degree of shape memory of the shape memory material. That is, a shape memory material including a thermoplastic material, for example, polyphenylene sulfide, with a greater degree of crosslinking more completely recovers it pre-compacting volume (in the case of open or closed cell foams) and/or pre-compacting shape than a shape memory material having a lesser degree of crosslinking.

Heating the cured thermoplastic polymer, generally as distinguished from curing, is similarly carried out at a temperature of about 200° C. to about 400° C., specifically about 250 to about 400° C., and more specifically about 300° C. to about 400° C. The heating time is for greater than or equal to 2 hours, specifically greater than or equal to about 5 hours, and still more specifically about 5 to about 20 hours. Heating, in this instance, refers to heating the cured thermoplastic polymer above its glass transition temperature after cold molding, to retain the memory shape during the first molding step.

Alternatively, the shape memory material is prepared by compounding the thermoplastic polymer with a crosslinker and optionally, an additive, to form a mixture, compacting the mixture at room temperature, and heating the compacted mixture in the presence of oxygen or without oxygen to a temperature greater than the glass transition temperature of the cured thermoplastic polymer. A heating time of less than or equal to about 200 hours is used to cure the thermoplastic polymer; when heating is done in the presence of oxygen, a shorter heating time of less than or equal to about 24 hours is used, and when heating is done in the absence of oxygen, a longer heating time less than or equal to 200 hours is used to cure the thermoplastic polymer. Compression molding of the cured thermoplastic polymer at above the glass transition temperature of the cured thermoplastic polymer, and de-molding at a temperature greater than or equal to about the glass transition temperature of the cured thermoplastic material, are then carried out. In this embodiment, heating is carried out at a temperature sufficient to cure the thermoplastic polymer, and hence curing and heating to above the glass transition temperature of the cured thermoplastic polymer are effected in the same step.

According to an embodiment, the shape memory material is a solid body. In an alternative embodiment in which the shape memory material is a foam, the thermoplastic polymer is compounded with a water-soluble additive, prior to curing. The water-soluble additive is then removed after de-molding, for example by soaking and/or extracting the de-molded article with a suitable solvent (such as water, where a water-soluble additive is used), carried out in batch or continuous mode, at ambient or elevated temperatures and pressures. In another embodiment, the shape memory material is a closed cell foam having a fluid (gas or liquid) in the cells. Without being bound by theory, a shape memory material that is a closed cell foam may have a shorter recovery time (as compared with the recovery time for an open cell foam) from its compacted shape because of additional stored energy due to the compression of the fluid in the closed cells.

The shape memory material so prepared exhibits improved shape memory properties when compared with a comparable shape memory material but prepared with an uncured thermoplastic polymer. For example, a shape memory material, prepared using the cured thermoplastic material, and when compacted by 30% based on pre-compacting volume, has a recovery time during deployment of less than or equal to about 10 minutes, measured at about 10 pounds per square inch (psi) at about 160° C. Also, a shape memory material prepared using the cured thermoplastic material, and when compacted by about 30% based on pre-compacting volume, recovers greater than or equal to about 90%, specifically greater than or equal to about 93%, more specifically greater than or equal to about 95%, and still more specifically greater than or equal to about 97%, of at least one dimension. It will be understood that shape recovery dimensions are determined upon deployment by heating the shape memory material at or above the glass transition temperature of the cured thermoplastic material.

Furthermore, the shape memory material shows high resistance when exposed to a chemical agent at a temperature greater than room temperature and pressure greater than atmospheric pressure. In this way, the shape memory material shows less reduction in properties such as, for example, glass transition temperature, than a comparable shape memory material prepared with an uncured thermoplastic polymer. In particular, the shape memory material, and the cured thermoplastic material, resist swelling and degradation of properties when exposed to chemical agents (e.g., water, brine, hydrocarbons, acids such as sulfuric acid, solvents such as toluene, etc.), even at elevated temperatures of up to 100° C., and at elevated pressures (greater than atmospheric pressure) or prolonged periods (e.g., of greater than one day).

The shape memory materials are useful for preparing elements for downhole applications. Exemplary elements include a packer element, a sand screen, a blow out preventer element, a submersible pump motor protector bag, a sensor protector, a sucker rod, an O-ring, a T-ring, a gasket, a sucker rod seal, a pump shaft seal, a tube seal, a valve seal, a seal for an electrical component, an insulator for an electrical component, a seal for a drilling motor, a seal for a drilling bit, or other downhole elements.

In an embodiment, a downhole element, e.g., a packer element or sand screen, includes a shape memory material including polyphenylene sulfide (PPS). The polyphenylene sulfide is crosslinked as described above. Additionally, the shape memory material is a foam having closed or open cells and includes polyphenylene sulfide. The closed or open cell polyphenylene sulfide foam is the cure product of being cured at a temperature of about 200° C. to about 400° C., for a total time of less than or equal to 200 hours, and the shape memory material is thermally activated between an actuated and unactuated shape. Further, the closed or open cell polyphenylene sulfide foam is a crosslinked product of curing in the presence of oxygen and heat. The polyphenylene sulfide in the closed or open cell polyphenylene sulfide foam is linear or branched and can be compounded with an additive as described above. In the case of closed cells, the cells can be at least partially filled with a fluid. The thermal activation of the shape memory material is in response to application of heat to the downhole element at a temperature greater than or equal to the glass transition temperature of the closed or open cell polyphenylene sulfide foam.

In an additional embodiment, a downhole element, e.g., a packer element or sand screen, includes a shape memory material including polyphenylene sulfide (PPS). The polyphenylene sulfide is crosslinked as described above. Additionally, the shape memory material is a solid made of polyphenylene sulfide. The solid polyphenylene sulfide is the cure product of being cured at a temperature of about 200° C. to about 400° C., for a total time of less than or equal to 200 hours, and the shape memory material is thermally activated between an actuated and unactuated shape. Further, the solid polyphenylene sulfide is a crosslinked product of curing in the presence of oxygen and heat. The polyphenylene sulfide in the solid is linear or branched and can be compounded with an additive as described above. The thermal activation of the shape memory material is in response to application of heat to the downhole element to a temperature greater than or equal to the glass transition temperature of the solid polyphenylene sulfide.

In another embodiment, the downhole element, e.g., a packer or sand screen, has a shape that is one of a relaxed shape, a constricted shape, or a deployed shape. In at least one linear dimension, a size of the relaxed shape is greater than or equal to a size of the deployed shape, and the size of the deployed shape is greater than a size of the constricted shape. The relaxed shape refers to the pre-compacted shape of the shape memory material, and the constricted shape refers to the compacted shape of the shape memory material. The deployed shape refers to the shape of the shape memory material after heating the downhole element in the constricted shape to a temperature greater than or equal to the glass transition temperature of the cured polyphenylene sulfide so that the downhole element transforms from the constricted shape towards the deployed shape en route to recovery of the relaxed shape.

The size of the downhole element refers to a dimension of the element. In an embodiment, the size is the transverse cross-section of the element, which is the cross-section of the packer relative to, for example, the transverse axis of a borehole that is substantially perpendicular to the longitudinal axis of the borehole. In further embodiments, the downhole element contains zero apertures or, alternatively, at least one aperture in order to provide a seal around another downhole element such as a production tube. In an additional embodiment, the downhole element in the relaxed shape or deployed shape has a size large enough to isolate or complete a borehole, for example, sealing an annulus within a borehole.

Figure 1A:
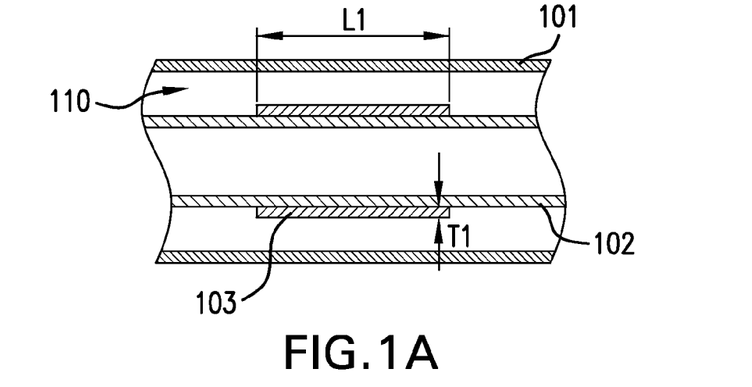
FIG. 1A shows a longitudinal cross-section of a casing, bore, and downhole element where the downhole element is seated against an outer diameter of a production tube.
Figure 1B:
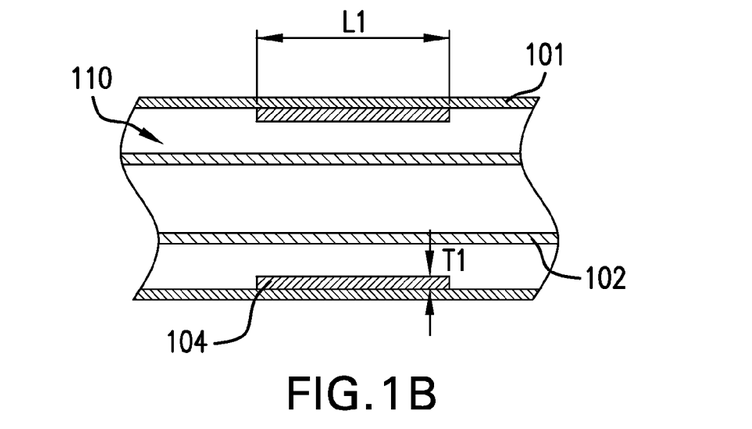
FIG. 1B shows a longitudinal cross-section of a casing, bore, and downhole element where the downhole element is seated against an inner diameter of the casing.
Figure 1C:
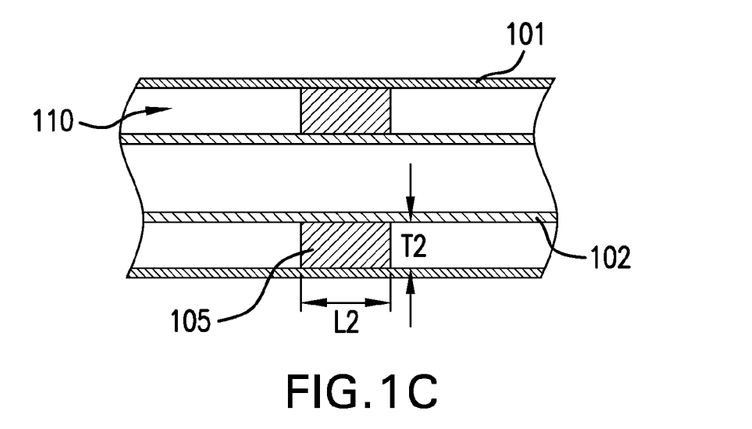
FIG. 1C shows a longitudinal cross-section of a casing, bore, and downhole element where the downhole element forms a seal in an annulus of a wellbore between the casing and a production tube.

FIGS. 1A, 1B, and 1C show a partial longitudinal cross section of a casing 101, production tubing 102, annulus 110, and different shapes of downhole elements 103, 104, and 105.

Referring to FIG. 1A, in an embodiment, a downhole element 103 is seated against an outer diameter of a production tubing 102 in a borehole. An annulus 110 is established between the outer diameter of the production tubing 102 and an inner diameter of a casing 101. The downhole element 103 is in a constricted shape and has length L1 and thickness T1. Alternatively, as shown in FIG. 1B, a downhole element 104 in a constricted shape is seated against the inner diameter of the casing 101.

When the downhole element 103 or 104 in the constricted shape is heated above its glass transition temperature, the stress from stored internal energy is relieved as the downhole element 103 or 104 transforms from the constricted shape (shown in FIGS. 1A and 1B, respectively) to the downhole element 105 (FIG. 1C) in a deployed shape. As shown in FIG. 1C, the downhole element 105 in the deployed shape has length L2 and thickness T2, where L2≤L1 and/or T2≥T1.

Figure 2A:
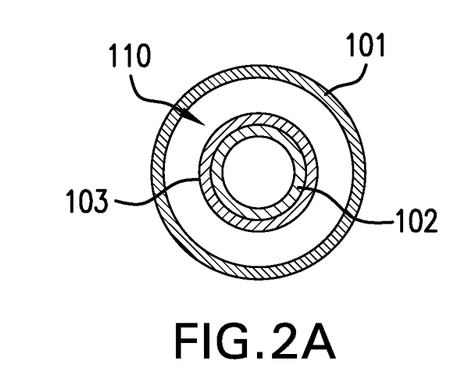
FIG. 2A shows a transverse cross-section of a casing, bore, and downhole element where the downhole element is seated against an outer diameter of a production tube.
Figure 2B:
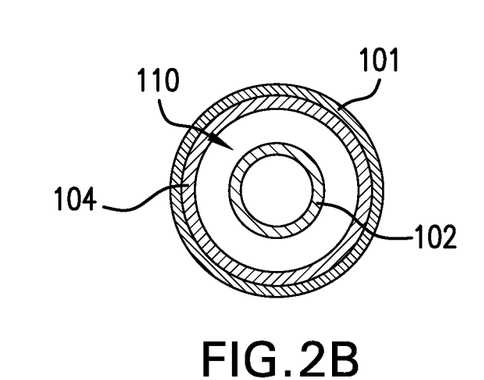
FIG. 2B shows a transverse cross-section of a casing, bore, and downhole element where the downhole element is seated against an inner diameter of the casing.
Figure 2C:
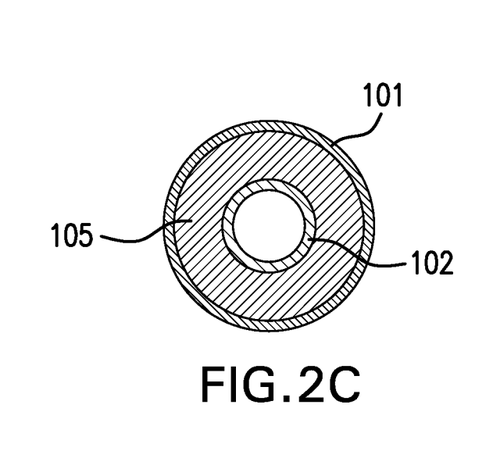
FIG. 2C shows a transverse cross-section of a casing, bore, and downhole element where the downhole element forms a seal in an annulus of a wellbore between the casing and a production tube.

As further shown in FIGS. 2A, 2B, and 2C, which respectively correspond to FIGS. 1A, 1B and 1C, the downhole elements 103 and 104 in the constricted shape change their respective radial dimension in transforming to downhole element 105 in the deployed shape. The annulus 110 is sealed by the downhole element 105 in the deployed shape.

In an embodiment, the downhole element is made by molding a shape memory material comprising cured polyphenylene sulfide to a relaxed shape. The shape memory material in the relaxed shape is heated to a temperature greater than the glass transition temperature of the cured polyphenylene sulfide and deformed from the relaxed state to a constricted shape. The memory material in the constricted shape is cooled to a temperature below the glass transition temperature of the cured polyphenylene sulfide to form the downhole element having the constricted shape, i.e., the cooling fixes the shape memory material into the constricted shape. In an embodiment, deforming the shape memory material includes compressing or stretching the shape memory material so that a size of the constricted shape is less than a size of the relaxed shape.

In an alternative embodiment, the downhole element is inserted into a borehole in a constricted shape and then deployed due to heating to a temperature that is greater than or equal to the glass transition temperature of the polyphenylene sulfide. The downhole element therefore deploys to a relaxed or deployed shape to isolate or complete the borehole. The shape memory material includes cured polyphenylene sulfide. In a further embodiment, the downhole element deploys from the constricted shape due to contact with cement or downhole fluid having a temperature greater than the glass transition temperature of the cured polyphenylene sulfide.

The above embodiments are further demonstrated in the following examples, which are intended as illustrative only and are not intended to be limited thereto.

Curing of Polyphenylene Sulfide. A bar sample of polyphenylene sulfide (PPS; RYTON® PRO9-60, Chevron-Phillips) was cured at 680° F. (360° C.) in air for 2 hours, and evaluated by differential scanning calorimetry (DSC; TA Instruments; scan rate 10° C./min.).

Figure 3:
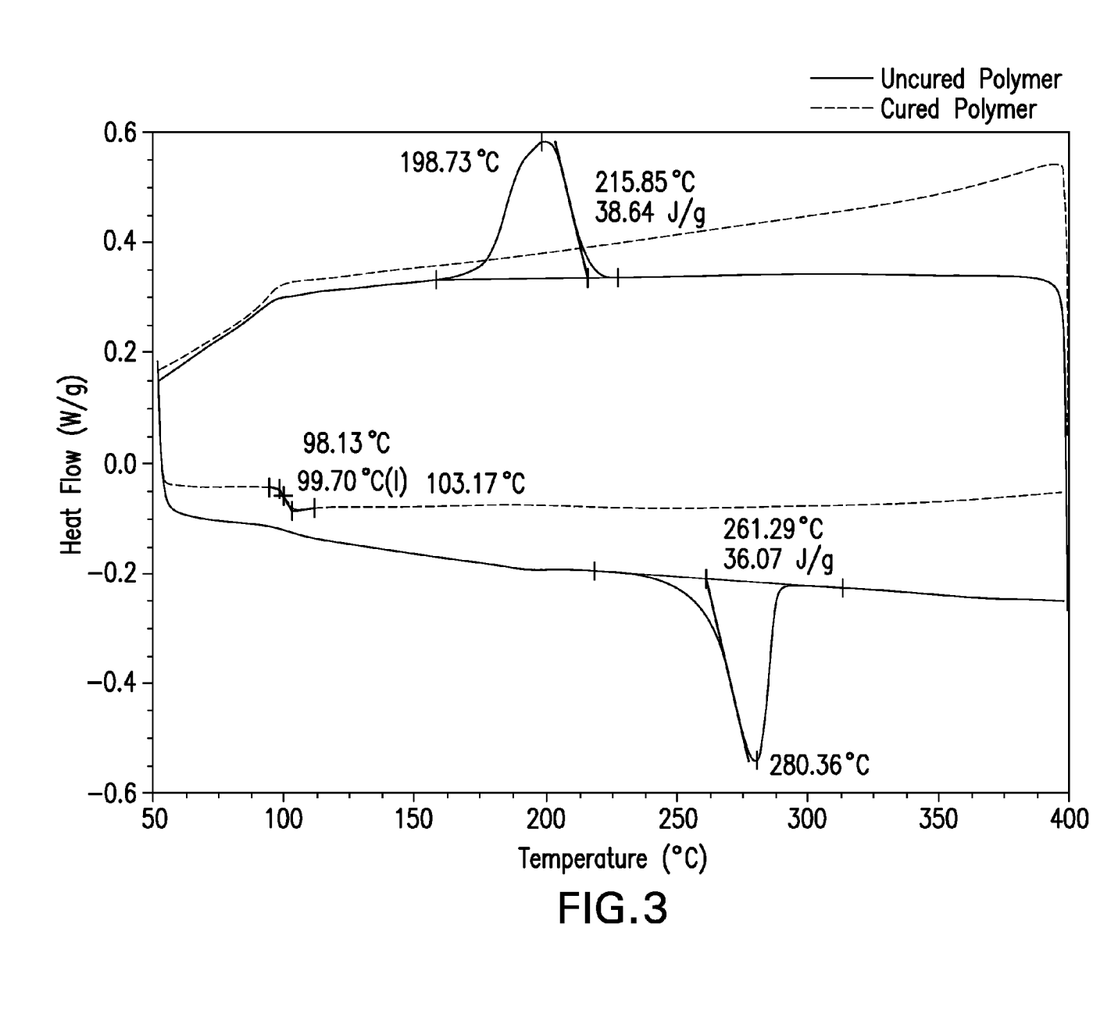
FIG. 3 shows a differential scanning calorimetry (DSC) trace of an uncured and cured thermoplastic polymer.

FIG. 3 shows the DSC trace (as a plot of Watts per gram versus temperature in ° C.). As seen in FIG. 3, an uncured sample of PPS exhibited a melting temperature ($T_m$) for the crystalline regions of about 280.4° C. (solid line), whereas the cured PPS exhibited only a glass transition temperature at about 99.7° C. Curing therefore renders the PPS amorphous as shown by the disappearance of the $T_m$ transition.

Figure 4:
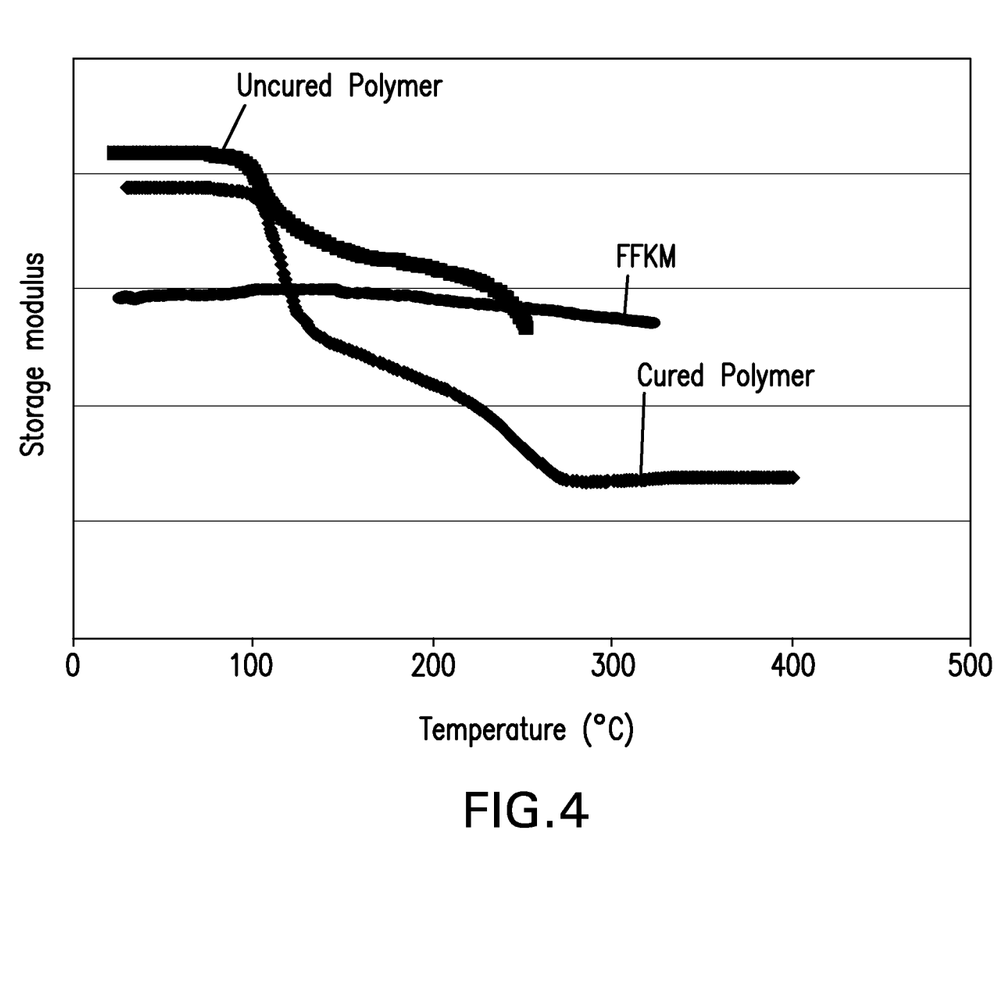
FIG. 4 is a dynamic mechanical analysis (DMA) plot of storage modulus versus temperature for a perfluoroelastomer, and an uncured and cured thermoplastic polymer.

FIG. 4 further shows a dynamic mechanical analysis (DMA) trace comparison for the cured PPS, the uncured PPS, and a perfluoroelastomer (FFKM K0090 from FKM Industries). As seen in FIG. 4, the storage modulus of cured PPS remained stable to 400° C., whereas the storage modulus of uncured PPS remained stable only to about 260° C., and that of the perfluoroelastomer remained stable only to about 320° C.

Shaped Memory of Cured PPS. Polyphenylene sulfide compacted pellets (PPS; RYTON® P-4, Chevron-Phillips) were pulverized to 20 or 40 mesh size and cured at 680° F. (360° C.) under air atmosphere for 2 hours. The cured PPS was packed into a button mold and compressed at room temperature, followed by heating to 680° F. (360° C.) under air atmosphere for 4 hours. The button mold was further compressed by 30% and heated to about the Tg of the cured PPS, and the molded cured PPS was then quenched in cold water after de-molding.

The button prior to compaction had a height of 5.84 mm, and after compaction and quench had a height of 4.74 mm (a compaction of 19%). Upon deployment by heating to 360° C., the deployed button had a height of 5.66 mm, for a height dimension recovery of about 97%. In addition, dynamic mechanical analysis (DMA; 10 psi pressure, 160° C.) of a similarly prepared pellet shows, upon deployment, dimensional recovery in less than 7 minutes.

While one or more embodiments have been shown and described, modifications and substitutions may be made thereto without departing from the spirit and scope of the invention. Accordingly, it is to be understood that the present invention has been described by way of illustrations and not limitation.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed:

1. A downhole element to isolate or complete a wellbore comprising:
    a shape memory material including polyphenylene sulfide, wherein the polyphenylene sulfide is cured at a temperature of about 200° C. to about 400° C., for a total time of less than or equal to 200 hours in the presence of oxygen, a crosslinker or a combination of both oxygen and a crosslinker,
    the shape memory material is thermally activated between an actuated and unactuated shape, and
    the polyphenylene sulfide in the shape memory material is a closed cell foam, open cell foam, or solid.

2. The downhole element of claim 1, wherein the polyphenylene sulfide is a crosslinked product of curing in the presence of oxygen and heat.

3. The downhole element of claim 2, wherein the polyphenylene sulfide is linear.

4. The downhole element of claim 3, wherein the polyphenylene sulfide has a molecular weight of about 500 g/mol to about 100,000 g/mol.

5. The downhole element of claim 2, wherein the polyphenylene sulfide is branched.

6. The downhole element of claim 5, wherein the polyphenylene sulfide has a molecular weight of about 500 g/mol to about 100,000 g/mol.

7. The downhole element of claim 2, wherein the polyphenylene sulfide has a degree of crystallinity of about 30% or less based on the degree of curing.

8. The downhole element of claim 2, wherein the closed cell foam comprises a void at least partially filled with a fluid.

9. The downhole element of claim 1, wherein the polyphenylene sulfide is compounded with an additive comprising a filler, crosslinker, processing aid, peroxide initiator, or a combination thereof before inclusion in the shape memory material.

10. The downhole element of claim 9, wherein the crosslinker comprises sulfur, silica, a quinone, a peroxy compound, a metal peroxide, a metal oxide, or a combination comprising at least one of the foregoing crosslinkers.

11. The downhole element of claim 9, wherein the filler comprises silica, glass fiber, carbon fiber, carbon black, polytetrafluoroethane, molybdenum disulfide, graphite, carbon nanotube, nanographene, nanoclay, polyhedral oligomeric silsesquioxane, or a combination comprising at least one of the foregoing.

12. The downhole element of claim 9, wherein the processing aid comprises an oligomer, a wax, a resin, a fluorocarbon, or a combination comprising at least one of the foregoing.

13. The downhole element of claim 9, wherein the polyphenylene sulfide comprises a reactive elastomer or fluoropolymer with the polyphenylene sulfide before cure, wherein the reactive elastomer or fluoropolymer grafts to the polyphenylene sulfide during cure to increase flexibility of the cured polyphenylene sulfide.

14. The downhole element of claim 1, wherein the polyphenylene sulfide has a glass transition temperature of greater than or equal to about 50° C.

15. The downhole element of claim 1, wherein the polyphenylene sulfide has a storage modulus of greater than or equal to about 1 megapascal measured at a temperature of greater than or equal to about 250° C.

16. The downhole element of claim 1, wherein the polyphenylene sulfide is semi-crystalline or amorphous.

17. The downhole element of claim 1, wherein the polyphenylene sulfide is partially cured.

18. The downhole element of claim 1, wherein the thermal activation of the shape memory material is in response to application of heat to the downhole element at a temperature greater than or equal to the glass transition temperature of the polyphenylene sulfide.

19. A method of preparing a downhole element for isolating or completing a wellbore comprising:
    compounding polyphenylene sulfide with a crosslinker, to form a mixture;
    forming a solid or foam of the mixture;
    heating and curing the solid or foam at a temperature of about 300° C. to about 400° C., for a heating time of less than or equal to about 72 hours to produce a cured solid or cured closed or open cell foam;
    compression molding the cured solid or cured closed or open cell foam; and de-molding at a temperature greater than or equal to about the glass transition temperature of the cured solid or cured closed or open cell foam to form the downhole element, wherein the downhole element is thermally activated between an actuated and unactuated shape.

20. The method of claim 19, wherein polyphenylene sulfide is compounded with a crosslinker and an additive to form a mixture, wherein the additive is a reinforcing or non-reinforcing filler comprising silica, glass fiber, carbon fiber, carbon black, polytetrafluoro ethane, molybdenum disulfide, graphite, carbon nanotube, nanographene, nanoclay, polyhedral oligomeric silsesquioxane, or a combination comprising at least one of the foregoing.

21. The method of claim 19, wherein the downhole element is prepared before being deployed downhole.

* * * * *